June 17, 1947.  A. SIMMON  2,422,316

COMPUTING DEVICE FOR PHOTOGRAPHIC CAMERAS

Original Filed May 25, 1945   9 Sheets-Sheet 1

Inventor
Alfred Simmon

By Walter E. Waleheim
Attorney

June 17, 1947.  A. SIMMON  2,422,316
COMPUTING DEVICE FOR PHOTOGRAPHIC CAMERAS
Original Filed May 25, 1945  9 Sheets-Sheet 3

Fig. 4

Inventor
Alfred Simmon
By Walter E. Wallheim
Attorney

June 17, 1947.  A. SIMMON  2,422,316
COMPUTING DEVICE FOR PHOTOGRAPHIC CAMERAS
Original Filed May 25, 1945   9 Sheets-Sheet 5

Fig: 6

Inventor
Alfred Simmon

By Walter E. Wallheim
Attorney

June 17, 1947.   A. SIMMON   2,422,316
COMPUTING DEVICE FOR PHOTOGRAPHIC CAMERAS
Original Filed May 25, 1945   9 Sheets-Sheet 6

Fig:7

Inventor
Alfred Simmon
By Walter E. Wallheim
Attorney

June 17, 1947.   A. SIMMON   2,422,316
COMPUTING DEVICE FOR PHOTOGRAPHIC CAMERAS
Original Filed May 25, 1945   9 Sheets-Sheet 8

Inventor
Alfred Simmon
by Walter E. Wallheim
Attorney

Fig. 10

Patented June 17, 1947

2,422,316

UNITED STATES PATENT OFFICE 2,422,316

COMPUTING DEVICE FOR PHOTOGRAPHIC CAMERAS

Alfred Simmon, Jackson Heights, N. Y., assignor to Simmon Brothers, Inc., Long Island City, N. Y., a corporation of New York Original application May 25, 1945, Serial No. 595,702, now Patent No. 2,418,370, dated April 1, 1947. Divided and this application March 29, 1946, Serial No. 657,990

1 Claim. (Cl. 235—64.7)

This is a division of an application for patent, Serial #595,702, filed May 25, 1945, now issued as No. 2,418,370 on April 1, 1947, and has for its object to provide a computing device for photographic purposes, which coordinates the various factors affecting a photographic exposure and indicates the required light intensity which must be reflected by the scene to be photographed in order to render a correct exposure for a given set of exposure controlling factors. Exposure controlling factors in this sense are the filter factor, the diaphragm ratio of the lens or the so-called F number, the film sensitivity, and the exposure time.

A further object of this invention is to provide a computing device of this character which can be made part of a camera and is adapted to be in operative relation with a built-in exposure meter. Thus the exposure meter indicates the actual value of the light reflected by the scene to be photographed, the computing device indicates the light required for a given set of exposure controlling factors, and a correct exposure is being obtained whenever the two light values are equal. While this application for patent describes in detail a camera and a meter with which the aforesaid computing device can be used, this is only by way of illustration and better to explain the working of the device. Application Serial #595,702 fully covers the camera itself.

In the preferred embodiment of this invention the means to adjust the various exposure controlling factors of the camera are in operative engagement with the means to adjust the corresponding indicators of the computing device so that, for example, the actual setting of the lens diaphragm corresponds to the value indicated by the diaphragm scale of the computing device.

The relations determining the required light intensity are well known and quite simple. The required light intensity increases in direct proportion to the filter factor, if a filter is being used, and it increases with the square of the diaphragm ratio of the lens, the so-called F number. The required light intensity increases in inverse proportion to the film sensitivity and in inverse proportion to the exposure time as determined by the shutter of the camera. The following formula reflects these conditions:

Required light intensity =
$$\text{Constant} \times \frac{\text{Filter factor} \times (\text{diaphragm ratio})^2}{\text{Film sensitivity} \times \text{exposure time}}$$

$$L = C \frac{Fi \times D^2}{S \times T}$$

Or in logarithmic terms:

$$\text{Log } L = \log C + \log Fi + \log D^2 - \log S - \log T$$

As can be noted this formula gives the value of the required light intensity as a function of four variables. In order to coordinate these four variables, numerous devices have been suggested in the past. Usually, some of these values were combined by means of mechanical sliderule-like devices and some of the other values were taken into account by electrical resistors or by means which may be called optical resistors, which decreased the reading of the exposure meter in proportion, or in inverse proportion, as the case may be, to some other magnitudes. Optical resistors in this sense are, for example, grey filters or adjustable diaphragms in front of the photoelectric cell. The objectionable feature of all these resistors is that they reduce the reading and therewith the sensitivity of the meter and that very often the meter indications become, therefore, small, difficult to read, and inaccurate. Electrical resistors have, furthermore, the disadvantage of getting frequently out of order since they must comprise very many turns of exceedingly thin wire.

Compared to this prior art, this invention has the advantage that the electric meter is always used at its maximum sensitivity and that always the largest possible movement of the pointer is being observed. It has the further advantage that no mechanical, electrical, or optical connection exists between the meter and the other parts of the camera. The computing device itself is quite simple and consists of a relatively small number of parts. It is very compact and, in particular, the final scale indicating required light values does not become longer than the scale of any of the four exposure controlling factors.

In the accompanying drawings,

Fig. 1 illustrates in diagrammatic form the principle of the computing device forming the subject matter of this invention;

Fig. 2 illustrates a more refined form of the device;

Fig. 3 shows a plan view of a camera with a built-in exposure meter and the computing device;

Fig. 4 is a front view of the same;

Fig. 5 is a cross sectional view along the plane of line 5—5 of Fig. 4, the operating levers being shown all in one plane for sake of clarity;

Fig. 6 is a cross sectional view along the plane of line 6—6 of Fig. 5;

Fig. 8 is again a front view of the camera but without a protective cover so that certain shafts and levers become visible which actuate the adjustments of the shutter and the diaphragm, respectively;

Like numbers of reference denote similar parts throughout the several views and the following specification.

The principle of the computing device can be best understood with the aid of Fig. 1. Four slides 21, 22, 23 and 24 are provided which may be moved individually by the operator in either direction. Each of these slides is equipped with a mark 26, 27, 28 and 29, respectively. These marks cooperate with four fixed scales which are calibrated in terms of filter factors, diaphragm ratio or actually the square of the diaphragm ratio, exposure time, and film sensitivity. The lines on these scales are spaced logarithmically, i. e., the distance of any line from the starting point of the scale is proportional to the logarithm of the value indicated by said line. The simplest way to accomplish this, and one which conforms very well with current photographic usage, is to arrange the values on these scales in geometric progression, each line indicating twice the value indicated by the preceding line. Two more slides 31 and 32 are mounted between slides 21 and 22 and slides 23 and 24, respectively. Slide 31 carries a double ended pivoted lever 33, and slide 32 carries an identical pivoted lever 34. As can be seen, slide 21 has two projections 35 and 36 forming a gap engaging one end of lever 33. In an identical manner, slide 22 has two projections 37 and 38 which form another gap engaging the other end of lever 33. The bearings, in which slides 21 and 22 slide, must have a relatively high amount of friction, but the bearings in which slide 31 slides have somewhat less friction. Consequently, if the operator moves, for example, slide 22, slide 21 will remain stationary and the fulcrum of the double ended lever 33, and therewith the entire slide 31, will move by half the amount of travel of slide 22.

The movements of slides 23 and 24 are coordinated in precisely the same manner and if, for example, the operator chooses to move slide 23, slide 24 will remain stationary and slide 32 will move by half the amount of the movement of slide 23.

Mounted between slides 31 and 32 is a seventh slide 40 which carries the double ended pivoted lever 41. One end of this lever 41 engages a gap formed by projections attached to slide 31, and the other end of lever 41 engages a gap formed by projections attached to slide 32. The bearings in which slide 40 slides must have a very low amount of friction and, consequently, if for example, slide 32 is moved, this movement, in turn, being due to a movement of either slide 23 or 24, slide 40 will move by half the amount of the travel of slide 32 or, if one assumes that the movement of slide 32 was due to a movement of slide 23, the travel of slide 40 will be one-quarter of the travel of slide 23. Slide 40 is equipped with a mark 45, which indicates on scale 46 the required light intensity for a correct exposure.

As can be seen, the values of the upper two scales increase from left to right, but the values for the two lower scales increase from right to left. Therefore, an increase in either the filter factor or the diaphragm ratio will cause an increase in the required light intensity as indicated by mark 45, but an increase in the value of the exposure time or the film sensitivity scales will cause a decrease of the required light intensity as indicated by mark 45. Due to this arrangement, the last two magnitudes are being counted negatively when adding up the movements of the four slides, as they affect the travel of the "result" slide 40. The movements of all 7 slides can now be computed:

| Movement of— | Movement of— | Movement of— |
| --- | --- | --- |
| Slide 21 = log $Fi$ <br> Slide 22 = log $D^2$ | Slide 31 = $\dfrac{\log Fi + \log D^2}{2}$ | Slide 40 = $\dfrac{\log Fi + \log D^2 - \log T - \log S}{4}$ |
| Slide 23 = −log $T$ <br> Slide 24 = −log $S$ | Slide 32 = $\dfrac{-\log T - \log S}{2}$ | |

In other words, the movement of slide 40 is proportional to the desired function, and the "result" scale 46 need not be longer than one-quarter of the sum of the four "input" scales, or approximately as long as any of these input scales. This is very important for compactness and a peculiar advantage of this arrangement. Other devices proposed for this purpose, for example, a flexible ribbon running over a number of pulleys, require an excessively long "result" scale.

It is most expedient to arrange the scale 46 which indicates the required light intensities, in adjacent arrangement to the exposure meter 50 and provide lines on the exposure meter dial whereby identical light values of scale 46 and exposure meter 50 are being connected. In this manner, the arrangement immediately indicates to the operator whether the required light intensity is larger, equal, or smaller than the actual light intensity as indicated by the meter. For a correct exposure, the operator has nothing more to do than to adjust at least one of the exposure factors in such a manner that mark 45 and the pointer of the exposure meter 50 are in register.

The mechanical arrangement as shown in Fig. 1, leaves in practice something to be desired since obviously the angle of rotation that can be covered by the pivoted levers 33, 34 and 41 is limited. This, in turn, limits the possible movement of all seven slides and, furthermore, makes the construction of a compact device difficult if not impossible. A solution which is identical in principle, but more practical becomes possible by considering the two ends of the double ended levers 33, 34 and 41, respectively, as two diametrically opposed teeth of a primitive gear and by considering in like manner, for example, the projections 35 and 36 attached to slide 21 as two teeth of a rudimentary gear rack. By substituting a complete gear rack for these two projections and by substituting complete gears for the three pivoted levers, one arrives at the design shown in Fig. 2. The four slides 61, 62, 63 and 64 correspond to the four slides 21, 22, 23 and 24, respectively. Each has a mark 66, 67, 68 and 69 which cooperates with a scale for the filter factor, diaphragm ratio, exposure time and film sensitivity, respectively. Between slide 61 and 62 is positioned slide 71 which carries a rotatable gear 63 which is in mesh with the teeth of slides 61 and 62. In like manner, a slide 72 carrying a gear 74 is positioned between slides 63 and 64, gear 74 being in mesh with the teeth of slides 63 and 64. A seventh slide carrying a gear 81 is positioned between slides 71 and 72, gear 81 being in mesh with the teeth of slides 71 and 72. Slide 80 is equipped with a mark 85 which indicates on a scale 86 the required light intensity. This scale 86 is again in adjacent arrangement to a meter 90 which indicates the actual light conditions, and again a correctly exposed picture will be obtained as soon as the operator brings mark 85 and the pointer of meter 90 into register. The movements of the various slides have exactly the same relation to each other as in Fig. 1, i. e., the travel of slide 71 equals half the sum of the travel of slides 61 and 62, the travel of slide 72 equals half the sum of the travel of slides 63 and 64 and finally the travel of slide 80 equals half the sum of the movement of slides 71 and 72. The scales which indicate the respective positions of the four input slides are again arranged in the manner described above, i. e., the values of the upper two scales for the filter factor and the diaphragm ratio, respectively, increase from left to right and the values of the two lower scales of the exposure time and film sensitivity, respectively, increase from right to left. Merely as an example, the seven slides are shown to be equipped with elongated slots which engage each two fixed pins thereby permitting a sliding straight line movement of each slide from right to left and vice-versa.

A camera equipped with a computing device built according to this invention is shown in Figs. 3 to 11. In the interest of clarity and simplicity, certain parts of this camera which do not form part of this invention have either been omitted, such as a range and view finder, or they have been shown rather diagrammatically, such as a focusing device of which only the actuating knob or handwheel 99 can be seen.

Camera housing

While the camera housing in the drawings has been shown as of one piece construction, it is in reality, of course, suitably sub-divided so as to permit convenient manufacture and assembly. This housing consists essentially of an inner part 101 shaped like a stepped cone forming a light chamber, confining the light rays passing through lens 109 and impinging upon the sensitized photographic film 132, and an outer shell comprising a top wall 102, a bottom wall 103, a left side wall 104, a right side wall 105, a front wall 106 and a rear wall 107. Underneath the top wall 102, and parallel thereto, is a dividing wall 108 which serves to support the various slides of the computing device.

The top wall 102 has a number of elongated slots which are preferably covered by glass or a transparent plastic material and through which the marks associated with the various slides of the computing device are visible. The various scales cooperating with these marks are engraved upon, or otherwise affixed to, the top wall of the camera. The top wall also carries the electrical exposure meter 110 with its pointer 111 and its dial 112, see Fig. 3.

Figure 7:
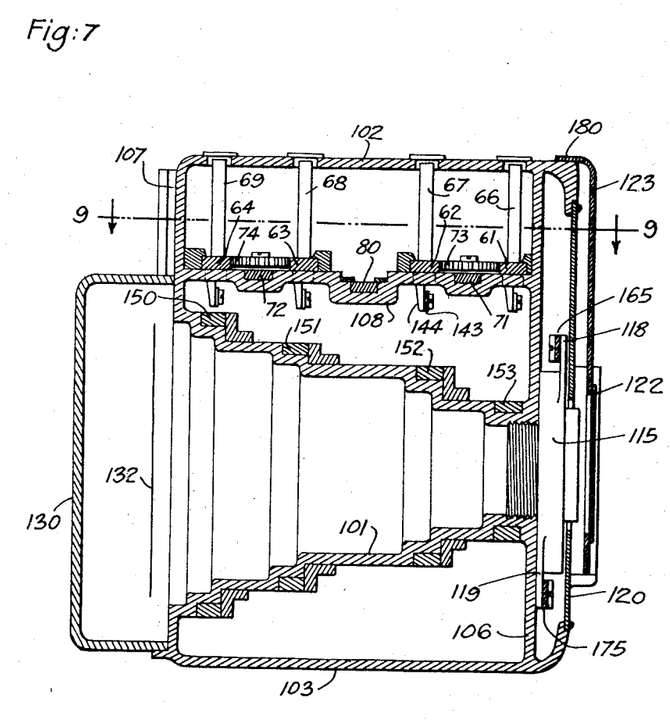
Fig. 7 is a cross sectional view along the plane of line 7—7 in Fig. 5.

The front wall 106 is adapted to receive a shutter 115 which, together with a camera lens 109, forms, as usual, an integral unit, Figs. 5 and 7. The shutter is, by way of example only, a typical "between the lens" shutter having a diaphragm adjusting ring and a speed adjusting ring concentrically disposed and coaxial with the camera lens. Two lugs 118 and 119 are fastened to the two rings controlling diaphragm and shutter speed, respectively, and other elements to be described later are attached to these lugs. In front of the front wall 106 is a safety cover 120, preferably made from sheet metal, which has a circular aperture for the lens, but which otherwise covers the shutter and its actuating mechanism. Attached to this safety cover are two guides 121 adapted to receive a filter 122 with its supporting structure 123, Figs. 4, 5 and 7. A photo-electric cell 124 which supplies current to the meter 110 may also be fastened to part 120.

The bottom wall 103 and the right side wall 105 have no noteworthy features and are merely shown for the sake of completeness. The left side wall 104 is curved and has four elongated slots permitting the movement of certain levers which actuate the slides of the computing device and the diaphragm and speed adjustment of the shutter, Figs. 3, 4, 5 and 6.

The rear wall is adapted to receive an exchangeable roll film magazine 130. This magazine contains two film spools 131 and a flexible sensitized film 132, which is, during operation, wound from one film spool onto the other in the usual manner. A knob 133 is provided for this purpose. The film magazine also comprises, in reality, a dark slide and means to keep the film as nearly flat as possible, but since these features do not form part of this invention, they have not been shown.

Computing device

Figure 9:
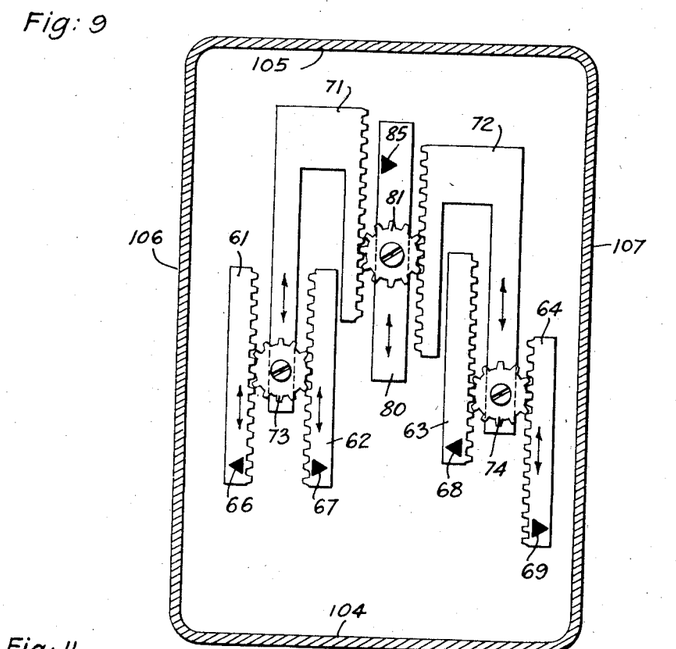
Fig. 9 is a cross sectional view along the plane of line 9—9 in Fig. 4 showing the computing device as actually incorporated into the camera.

The computing device as actually incorporated in the camera can be seen in Figs. 7 and 9. The actual design, as seen in Fig. 9, corresponds very closely to the diagrammatic drawing in Fig. 2 and has, therefore, been assigned the same reference numbers to corresponding parts. The only departure is the shape of the intermediate slides 71 and 72 which are now U-shaped, one leg of the U carrying the gears 73 and 74, respectively, and the other leg being equipped with teeth forming gear racks. This obviously does not affect the principle of the computing device, but merely makes a more compact arrangement possible since new gear 81 does not have to be excessively large and since it is now possible to arrange all parts more nearly in one common plane.

Means to shift slides of computing device

In order to enable the operator to shift the slides of the computing device conveniently, an arrangement has been provided for each slide which can best be seen in Fig. 6. It comprises a rotatable lever 152 with a handle which protrudes through one of the aforementioned elongated slots of the left camera side wall 104, said lever having a lug 142 which, by means of a connecting rod 143 moves another lug 144, which in turn protrudes through an elongated slot in wall 108 and is fastened to one of the 4 input slides of the computing device, in this instance, for example, to slide 62, indicating the diaphragm ratio. Similar arrangements are provided for the other three input slides, as can be seen in Fig. 5, lever 150 actuating the slide for the film sensitivity, lever 151 actuating the slide for the exposure time, and lever 153 actuating the slide for the filter factor. The steps of the above mentioned "stepped cone" or light chamber serve as pivots for these 4 levers which swivel concentrically with respect to the axis of the camera lens. This concentric arrangement is not strictly necessary, but it is compact and the large bearing diameter provides more or less automatically the desired amount of friction in the slide adjusting mechanism.

Means to adjust the lens diaphragm and the shutter speed

It is desirable to adjust the actual diaphragm opening of the lens and the actual speed adjustment of the shutter simultaneously with the adjustment of the corresponding slides of the computing device, since otherwise the operator would have to make two adjustments for each of these factors which is not only inconvenient, but which would make mistakes possible since the operator may not make both adjustments properly at all times. The diaphragm and speed settings usually do not follow any discernible laws and, therefore, cams of suitable configuration must be interposed into the adjusting mechanism at some place in order to provide the necessary corelation. An embodiment of this idea is shown in Figs. 6 and 9. Lever 152 which, as explained above, controls the position of the diaphragm indicating slide 62, carries a cam 160. Sliding on this cam is a cam following roller 161 which is attached to a lever 162. This lever is fastened to a shaft 163 which runs parallel to the lens axis, see Fig. 5. The front end of this shaft penetrates the front wall 106 of the camera. This front end can be seen in Fig. 8 which shows the camera with the safety cover 120 removed. The front end of shaft 163 is fixedly attached to a lever 164 which, by means of connecting rod 165, actuates lug 118 which, in turn, moves the diaphragm adjusting ring of the lens and shutter assembly. A very similar arrangement is used for the speed setting of the shutter. Lever 151 is equipped with a cam 170, a cross-section of which can be seen in Fig. 5. This cam cooperates with a cam following roller 171 attached to a lever 172 which is not shown but has a shape very similar to that of lever 162. This lever is attached to a shaft 173 parallel to the lens axis and very similar to shaft 163, but longer. Its position with respect to the other parts of the camera can be seen in Figs. 6 and 8. Its front end carries a lever 174 which corresponds to lever 164 of the diaphragm adjusting mechanism, but is arranged in a plane slightly behind it so as to avoid interference. Lever 174 actuates, by means of a connecting rod 175, lug 119 which, in turn, is attached to the speed adjusting ring of the shutter 115. Two springs 166 and 176 are provided which bias the diaphragm adjusting mechanism and the shutter speed adjusting mechanism, respectively, in such a way that the cam following rollers 161 and 171 are always in contact with their respective cams 160 and 170.

Means to coordinate film factor and film sensitivity

To make the camera as foolproof as possible, it is desirable to provide means to facilitate the correct adjustment of the slides for the filter factor and the film sensitivity, respectively. Referring to Fig. 4, it will be noted that the filter 122 is carried by a filter mount 123, which in turn can be inserted into the grooves of the two filter guides 121 as described above. The upper end of this filter mount carries an abutment 180 which shows a legend describing the filter and a fixed mark which, when the filter is properly inserted into the camera, shows on the filter factor scale on top of the camera the proper numerical filter factor for this filter. The operator then merely moves lever 153 until the mark of the filter factor slide of the computing device and the mark on the abutment 180 of the filter mount are in register as shown in Fig. 3.

On top of the camera itself, opposite the first line of the filter factor scale, is a similar mark which is not visible as soon as any filter is inserted into the camera, but becomes visible whenever the camera is being used without any filter. This mark is shown in dotted lines in Fig. 3. This reminds the operator to move lever 153 back until the movable mark of the filter factor indicating slide also points to the first line. In other words, both visible marks must, at all times, be in register.

Similar means are provided for the convenient adjustment of the computing device for various film sensitivities. The exchangeable roll film magazine 138 carries a nameplate with a mark, describing the film with which this magazine is loaded. When the roll film magazine is inserted into the camera this nameplate with its mark is in adjacent arrangement to the film sensitivity scale on top of the camera and the mark points at that line of the scale which corresponds to the film sensitivity of the film in the magazine. The operator then moves lever 150 until the sliding mark of the film sensitivity slide of the computing device is in register with the fixed mark on top of the roll film magazine.

Figure 10:
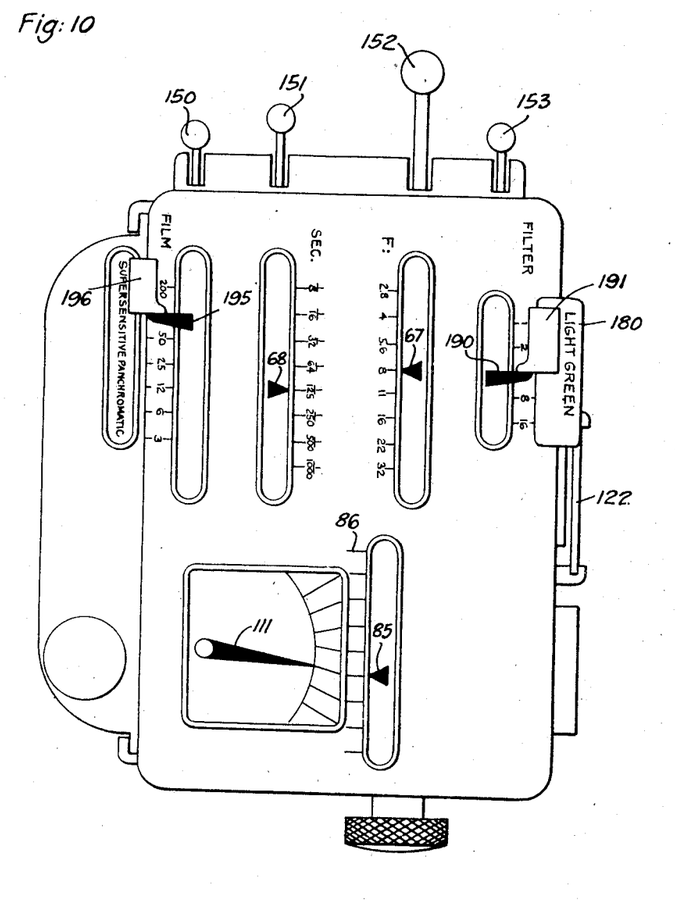
Fig. 10 is substantially the same as Fig. 3, but showing modified means for the setting of the filter factor and the film sensitivity.
Figure 11:
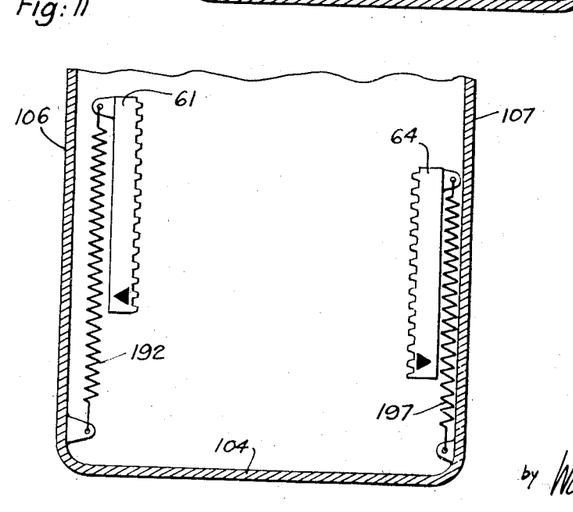
Fig. 11 show a slight modification of the mechanism used in connection with the camera in accordance with Fig. 10.

The entire arrangement can be seen in Fig. 3. It is simple; it provides the operator, at a glance, with all pertinent information on the adjustments of the camera, and the juxtaposition of the two respective marks for the filter factor and the film sensitivity is a very effective and substantially foolproof reminder for the operator. However, a still more nearly foolproof arrangement can be made and is shown in Fig. 10 which shows a plan view of a camera, very similar to Fig. 3 except for certain modifications which are about to be described. Instead of mark 66 indicating the filter factor on the filter factor scale, there is an actual projection 190 protruding through the elongated slot in the top wall of the camera housing. This slot is, of course, no longer closed by a transparent window. A similar projection 191 is provided on the abutment 180 of the filter mount 122. The filter factor indicating slide is biased by a spring 192 which is shown in Fig. 11 and has, therefore, the tendency to return automatically to the lowest setting on this filter factor scale, i. e., to line #1, and it will assume this position in the absence of a filter. However, should the operator decide to use a filter, he merely moves the projection 190 as far to the right as necessary, by lifting handle 153, inserts the filter mount and releases handle 153, whereupon projection 190 will automatically move back until it meets the projection 191 on the filter mount. Projection 190 has a shape which will not permit the correct insertion of the filter mount into the camera unless the operator proceeds in the manner described.

An identical arrangement can be provided for the automatic adjustment of the film sensitivity slide 64 of the computing device. This slide 64 is now, instead of a mere mark 69, equipped with an actual projection 195 which protrudes through the elongated slot on top of the camera housing and which cooperates with a similar mark 196 fastened to the exchangeable roll film magazine 130. The slide 64 is again biased by a spring 197, shown in Fig. 11. The operator again proceeds by first shifting slide 64 with its projection 195 sufficiently far towards the right, whereupon he inserts the roll film magazine and releases handle 150. Spring 197 then will cause slide 64 with its projection 195 to return until projection 195 meets projection 196. In other words, the film sensitivity slide of the computing device will in this manner automatically assume the correct position. The mark 196, which is affixed to the roll film magazine, is shaped in such a manner that correct insertion of the magazine is not possible unless the operator shifts mark 195 first in the described manner.

Sometimes, particularly in the case of relatively inexpensive cameras, it may be advisable to keep the appearance of the camera as simple as possible. In this case, the two scales for the filter factor and film sensitivity may be omitted, and merely the coacting projections 190 and 191, and 195 and 196, may be provided. The proper adjustment of the computing device is automatically assured by this interlocking arrangement, and the operator is very often not interested in the exact numerical values of filter factor and film sensitivity, so long as correct exposures are being obtained.

The operation of the camera and the coaction of the various parts can now be fully understood from the description above. Depending upon the type of picture which the operator plans to take, he selects a film magazine loaded with a suitable type of film and inserts it into the camera. If the camera is equipped with an interlocking arrangement, such as shown in Fig. 10, the film sensitivity slide of the computing device will automatically be in the correct position after insertion of the magazine. With the arrangement of Fig. 3 the operator moves lever 150 until mark 69 is in register with the corresponding mark on the film magazine. The operator then decides whether a filter may advantageously be used and, if necessary, selects a suitable one and inserts it into the camera. With an interlocking arrangement such as shown in Fig. 10, the filter factor slide of the computing device assumes automatically the correct position. With a device such as shown in Fig. 3, the operator moves handle 153 until mark 66 is in register with the corresponding mark on the filter mount.

The next step is to adjust the exposure time of the shutter and of the computing device by moving handle 151. The most favorable exposure time depends upon a number of factors, but more than anything else, upon the speed with which the object to be photographed moves. It is usually advantageous to choose the longest possible exposure time compatible with the speed of a moving object because this permits the use of the smallest possible diaphragm stop, thereby assuring the best possible depths of focus.

The camera is then pointed at the scene to be photographed, usually with the aid of a view finder which, however, as explained above, is not shown on the drawings. Light reflected by the scene impinges upon the photo-electric cell 124 and causes it to generate an electrical current which is measured by the meter 110 on top of the camera. The pointer 111 may, for example, assume the position shown in Fig. 3. The operator then adjusts the diaphragm, and the diaphragm slide of the computing device, by moving handle 152 until mark 85 is in register with the pointer 111 of the indicating meter. This indicates that all factors have been chosen in such a way that the required light value, as computed by the computing device, equals the actual light value as measured by the exposure meter. The camera is now ready for a correctly exposed picture.

An experienced operator will usually choose his factors in such a way that, by merely moving the diaphragm setting, mark 85 can be brought into register with the meter pointer without difficulty. Under certain circumstances, however, this may be impossible; for example, an inexperienced operator may choose a slow film, a dense filter, and a short exposure time under unfavorable light conditions and then, even with the diaphragm wide open, the required light intensity may still be larger than the actual intensity as indicated by the meter. In other words, mark 85 will be to the right of pointer 111. This means that no correctly exposed picture is possible under the circumstances and the operator has to change some of the exposure controlling factors. Usually it is most convenient to use a longer exposure time, but should this not be sufficient, the operator has to use a faster film, or a less dense filter, or omit the filter altogether.

In the same manner, the operator may choose inadvertently a very fast film, no filter, and a relatively long exposure time under extremely bright light conditions, for example, at the seashore in bright sunshine. It is possible that under these conditions the actual light intensity may consistently be higher than the required intensity so that over-exposure would result. This is immediately indicated by the fact that mark 85 cannot be brought in register with point 111, but remains always to the left of it. Again, some exposure factors would have to be changed; for example, a higher shutter speed may have to be chosen. Since, under ordinary conditions, the adjustment of the diaphragm will be made last, i. e., almost immediately before the actual exposure, a larger and more conspicuous handle 152 has been provided for this purpose.

I wish to emphasize that this description covers merely a preferred embodiment of the invention and a method of applying its principles to a camera, and that many details may be freely changed without departing from its spirit. For example, while I have consistently shown stationary or fixed scales attached to the camera housing and movable marks attached to the various slides of the computing device, this arrangement may very well be reversed, i. e., the scales may be attached to the slides and stationary marks may be affixed to the camera housing. It has already been mentioned that for the purpose of this invention the two ended pivoted levers, such as shown in Fig. 1, may be considered the mechanical equivalent of gears, and that a slide equipped with two projections forming a gap between themselves may be considered the mechanical equivalent of a gear rack. The cam and lever arrangement illustrated in Fig. 6 may also be reversed. As shown, the slides of the computing device, for example, slide 62, Fig. 6, are actuated through connecting rods 143 by lugs 142 affixed to the adjusting levers, for example, 152, and the levers adjusting the diaphragm 164 and the shutter speed 174, respectively, are actuated by cams 160 and 170, also affixed to said levers. Obviously, the opposite arrangement, i. e., the actuation of the computer slides by cams and the actuation of the diaphragm and speed adjusting mechanism by connecting links, is the obvious mechanical equivalent of the arrangement shown and should be construed to fall within the scope of this invention. The means to actuate the slides of the computing device do not necessarily have to be constructed in the manner shown and, particularly, the actuating levers 150, 151, 152 and 153 do not have to rotate on bearings which are concentric with the lens axis. While I have shown an exchangeable roll film magazine, it will be obvious that a magazine containing any other type of sensitized material such as cut or pack films would be equally applicable. Variations of this character and obvious mechanical equivalents of this type shall be construed to be covered by the appended claim.

What I claim as new is:

A device to compute the light intensity required for a correctly exposed picture in a photographic camera from a given set of values for the filter factor, diaphragm opening, shutter controlled exposure time and film sensitivity, respectively, said device comprising a supporting structure and four slides, said slides movable individually and independently along straight and parallel lines, each of said slides having a mark, a stationary scale on said structure for each of said slides and cooperating with the mark of its slide, the first of said scales calibrated in logarithmically spaced values of filter factors, the second of said scales calibrated in values of the ratio of the focal length of the camera lens divided by the effective diaphragm diameter of said lens, the spacing of said values being in proportion to the logarithms of their squares, the indicated values of both scales increasing in the same direction, the third of said scales calibrated in logarithmically spaced values of the exposure time of the camera shutter, and the fourth of said scales calibrated in logarithmically spaced values of the film sensitivity, the indicated values of said last two scales increasing in the opposite direction to that of the first two scales, each of said slides equipped with a gear rack, the racks of one pair of slides facing each other, and racks of the other pair of slides facing each other, a gear between the racks of the first pair and in mesh with both, a fifth slide, said gear mounted rotatably upon said fifth slide, a second gear between the racks of the second pair and in mesh with both, a sixth slide, said second gear mounted rotatably upon said sixth slide, said fifth and sixth slides movable along straight lines parallel to the lines of movement of the first four slides, and each equipped with a gear rack, said racks facing each other, a third gear between the racks of said fifth and sixth slides and in mesh with both, a seventh slide, said third gear mounted rotatably upon said seventh slide, said seventh slide movable along a straight line parallel to the movement of all other slides, and a mark on said seventh slide cooperating with a stationary scale on said structure calibrated in logarithmically spaced values of required light intensities.

ALFRED SIMMON.